(12) United States Patent
Rogers et al.

(10) Patent No.: US 8,307,090 B2
(45) Date of Patent: *Nov. 6, 2012

(54) SYSTEM AND METHOD FOR UPDATING INFORMATION USING LIMITED BANDWIDTH

(75) Inventors: Seth Rogers, Palo Alto, CA (US); Assimakis Tzamaloukas, San Jose, CA (US)

(73) Assignee: Dash Navigation Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/361,035

(22) Filed: Jan. 30, 2012

(65) Prior Publication Data

US 2012/0131200 A1    May 24, 2012

Related U.S. Application Data

(63) Continuation of application No. 13/182,860, filed on Jul. 14, 2011, now Pat. No. 8,112,522, which is a continuation of application No. 11/511,765, filed on Aug. 28, 2006, now Pat. No. 7,987,260.

(51) Int. Cl.
*G06F 15/173* (2006.01)

(52) U.S. Cl. ......................................... 709/226

(58) Field of Classification Search ........... 709/223–226
See application file for complete search history.

(56) References Cited

U.S. PATENT DOCUMENTS

| | | | |
|---|---|---|---|
| 5,491,694 A | 2/1996 | Oliver | |
| 5,845,262 A | 12/1998 | Nozue et al. | |
| 6,185,737 B1 | 2/2001 | Northcutt et al. | |
| 6,324,184 B1 | 11/2001 | Hou | |
| 6,483,870 B1 | 11/2002 | Locklear, Jr. et al. | |
| 6,912,575 B1 | 6/2005 | Swift et al. | |
| 6,944,166 B1 | 9/2005 | Perinpanathan et al. | |
| 6,975,963 B2 | 12/2005 | Hamilton et al. | |
| 7,039,441 B1 | 5/2006 | Reudink et al. | |
| 7,193,966 B2 | 3/2007 | Gupta et al. | |
| 7,299,284 B2 | 11/2007 | McKinnon, III et al. | |
| 7,499,453 B2 | 3/2009 | Carlson | |
| 2002/0044526 A1 | 4/2002 | Rijhsinghani et al. | |
| 2002/0046264 A1 | 4/2002 | Dillon et al. | |
| 2003/0191853 A1 | 10/2003 | Ono | |
| 2003/0232625 A1 | 12/2003 | Bhushan et al. | |
| 2004/0098325 A1 | 5/2004 | Shibasaki | |
| 2004/0103159 A1 | 5/2004 | Williamson et al. | |
| 2004/0136408 A1 | 7/2004 | Tomobe et al. | |
| 2004/0221032 A1 | 11/2004 | Bernstein et al. | |
| 2004/0235527 A1 | 11/2004 | Reudink et al. | |
| 2005/0243755 A1 | 11/2005 | Stephens | |
| 2006/0026019 A1 | 2/2006 | Sethi et al. | |
| 2007/0060099 A1 | 3/2007 | Ramer | |
| 2007/0081543 A1 | 4/2007 | Brenes et al. | |
| 2007/0174246 A1 | 7/2007 | Sigurdsson et al. | |
| 2007/0185768 A1 | 8/2007 | Vengroff | |
| 2007/0219715 A1 | 9/2007 | Uyeki et al. | |
| 2009/0103559 A1 | 4/2009 | Pickering et al. | |

*Primary Examiner* — Jerry Dennison

(74) *Attorney, Agent, or Firm* — Novak Druce + Quigg, LLP (57) ABSTRACT

A system and method detects an amount of data attributed to a device including reports sent to the device, and reduces the amount of data being used to provide reports to the device if the amount of data attributed to the device exceeds an amount assigned to the device. Data uploaded from the device is also minimized.

15 Claims, 6 Drawing Sheets

SYSTEM AND METHOD FOR UPDATING INFORMATION USING LIMITED BANDWIDTH

CROSS REFERENCE TO RELATED APPLICATIONS

This application is a continuation of U.S. patent application Ser. No. 13/182,860, filed on Jul. 14, 2011, now U.S. Pat. No. 8,112,522, and entitled "System and Method for Updating Information Using Limited Bandwidth," which is a continuation of U.S. patent application Ser. No. 11/511,765, filed on Aug. 28, 2006, now U.S. Pat. No. 7,987,260, and entitled "System and Method for Updating Information Using Limited Bandwidth," both of which are incorporated herein by reference.

FIELD OF THE INVENTION

The present invention is related to computer software and more specifically to computer software for updating information over a cellular telephone network.

BACKGROUND OF THE INVENTION

Cellular telephone service providers allow parties to purchase excess capacity in bulk. A provider may allow the purchaser to purchase an amount of capacity in excess of the contracted amount in exchange for a higher rate. The purchaser may use the bulk capacity for a variety of applications.

One such application is to update information in mobile devices. For example, if the mobile devices are vehicle navigation systems containing a conventional cellular telephone subsystem, current traffic information for the navigation system may be updated using the bulk cellular telephone capacity. This allows the users of the devices to obtain travel times between two points. Because traffic information can change rapidly, a significant amount of capacity of the communication network would be required to keep every device updated with current data at all times. To keep costs low, it is desirable to limit the amount of data provided over the communication network.

One way of limiting the amount of data would be to limit updates to times when the device was operating. This arrangement causes some users who use their devices a lot to be heavy users and others to be light users. It would be possible to charge users based on how heavily they use the system, but users who could be charged more may be reluctant to use such a system because the costs could be difficult to anticipate in advance. So it can be undesirable to charge users based on use.

One way of providing certainty in the cost of updating the devices would be to simply cut off service to users who exceed a contracted usage amount. However, such a user may be reluctant to use a system if the user couldn't rely on it being available when it was needed. Another way of providing certainty would be to allow every device to receive all of the updates it needs. One could price the system for the light users and absorb the costs of the heavy users, but such an arrangement might not be profitable. Alternatively, the update service provider could raise prices and charge everyone an average price, but this would force the light users to heavily subsidize the heavy users, and such users may find the system to be too costly. The light users would abandon the system and the update service provider would have to charge ever increasing costs, another undesirable arrangement.

It is thus desirable to allow everyone to pay the same price, but not require light users to heavily subsidize heavy users. However, if all users occasionally use the communication facility less than anticipated, it can be desirable to allow the heavy user to use the capacity of the communication facility so that it does not go unused.

What is needed is a system and method that can update information over a network without exceeding the contracted use of the network, without cutting off heavy users, but without allowing them to significantly exceed an allotment unless spare capacity is available.

SUMMARY OF INVENTION

A system and method classifies devices based on their use of a communication facility such as a cellular telephone network. The system and method may assign devices into one of a small number of classifications, or may assign devices into any of a relatively large number of classifications, based on their use of the communication facility. The system and method identifies updates for each classification, with updates for classifications corresponding to heavy users containing less information than updates for classifications corresponding to lighter users.

The system and method provides information such as update information to a device based on the classification as well as the available capacity of the communication network, allowing the heaviest users to exceed an allotted amount of capacity of the communication network that might otherwise go unused. The system and method thus regulates the use of the communication facility by restricting the amount of information provided to devices tending to use more than their share of the capacity.

Any or all of different manners of restricting information may be used in order to consume less capacity of the communication network to provide updates to devices. For example, the information may be provided less frequently to devices assigned classifications corresponding to lower amounts of data than the frequency of update information provided to devices assigned to classifications corresponding to higher amounts of data. The update information provided to devices assigned to classifications corresponding to lower amounts of data may be provided with less granularity than the update information provided to devices assigned to classifications corresponding to higher amounts of data. Smaller subsets of the update information may be provided to devices assigned to classifications corresponding to lower amounts of data than that provided to devices assigned to classifications corresponding to higher amounts of data.

The system and method updates the classifications of devices, so that as devices use the communication facility more and more, they are given less and less information for each update. As devices use the communication facility less and less, they are given more and more information for each use. Classifications may be assigned based on more than just use of the system. The amount of data capacity available to the update service provider may be taken into consideration to ensure that the capacity of the communication network contracted by the update service provider does not go unused. Thus, if use of the communication network falls to a level that will cause capacity to go unused, classifications under the lowest level may be reassigned higher, or at least not lowered, so that the contracted capacity of the communication network is fully used during each contract period.

In one embodiment, each device may obtain information from any number of alternate communication networks other than the communication network for which the update service provider must pay to use. Devices obtaining update information using alternate communication networks may so indicate, and thus not be provided the update information over the communication network, reducing the use of the communication network by that device and enabling the device to increase the level of data it is assigned.

The system and method also allows for the devices to provide data to the network. In one embodiment, devices that are assigned a level corresponding to less data may queue the data and provide it in batches based on the level to which the device has been assigned, allowing the device to spread the overhead of communication across larger amounts of data, thus reducing the amount of capacity of the communication network used by the device to communicate information. Alternate communication networks can be used to further reduce the amount of data the device communicates over the network.

DETAILED DESCRIPTION OF A PREFERRED EMBODIMENT

Figure 1A:
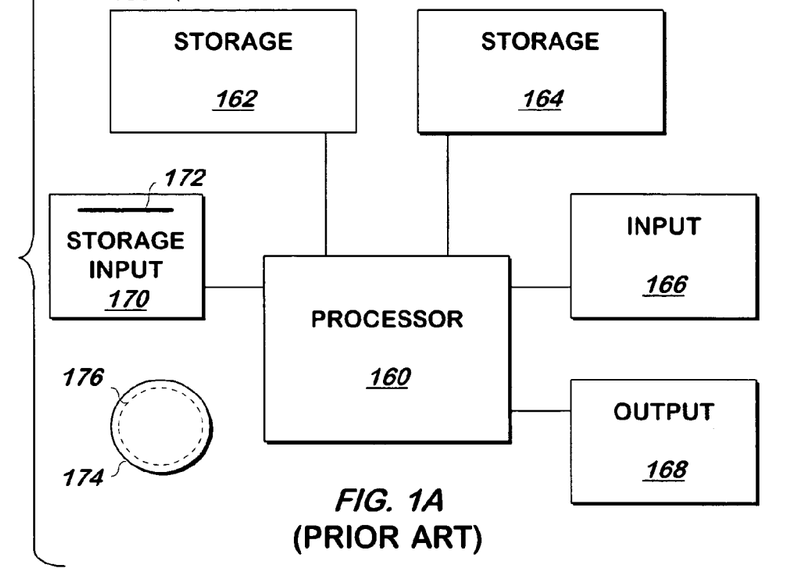
FIG. 1A is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is part of an embedded system and includes an ARM processor and related components commercially available from ARM, such as the conventional XScale family of components available from Marvell Technology Group, or any other embedded system components running in a device. Other embodiments of computer systems 150 include a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

The present invention may be used in any environment, a representative one of which will now be described.

Figure 1B:
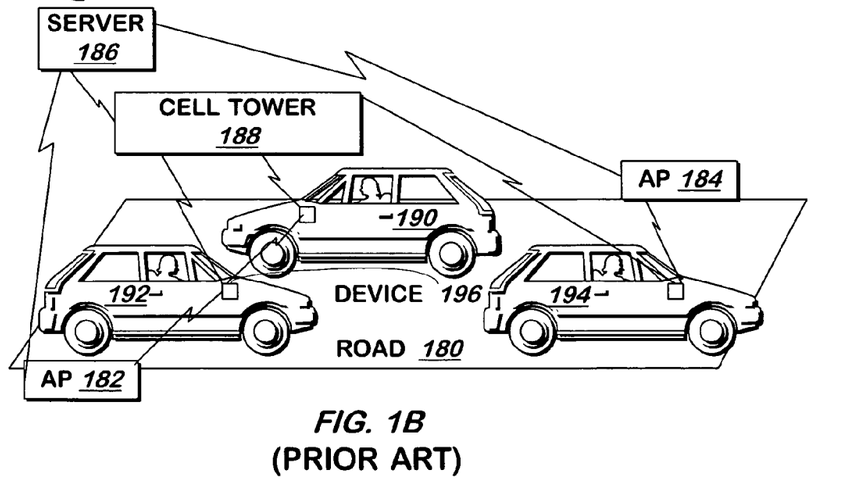
FIG. 1B is a diagram of three automobiles on a road according to one embodiment of the present invention.

Referring now to FIG. 1B, a conventional road with wireless access points being driven on by conventional automobiles is shown according to one embodiment of the present invention. Automobiles 190, 192, 194 drive on road 180, which contains roadside wireless access points 182, 184, which in turn include conventional wireless access points running any of the conventional 802.11x protocols. Some or all of automobiles 190, 192, 194 have a device such as device 196 containing a conventional wireless radio (not shown) for communicating with access points 182, 184 and the radios of other automobiles 190, 192, 194. Device 196 may include a conventional GPS receiver for use as described herein. Additionally, device 196 contains a conventional cellular telephone communications subsystem (not shown) for communication with conventional cellular telephone tower 188 containing conventional cellular telephone radio equipment operating in a conventional manner. Cell tower 188 communicates with server 186, which is a conventional computer system as described above. This allows communication between device 196 and server 186. As noted, other automobiles 190, 194 also contain devices similar or identical to device 196.

Although the present invention is described with respect to automobiles, the present invention may be used in any vehicle, such as a boat, plane, bicycle or other moving object.

Wireless access points 182, 184 are coupled to a conventional network such as the Internet, Ethernet or both, and the network is coupled to server 186, which may include one or more conventional servers. Three automobiles 190, 192, 194 and two wireless access points 182, 184 are shown in one embodiment of the present invention, though other numbers of these items may be used.

Radios in automobiles 190, 192, 194 may communicate with access points 182, 184 via conventional wireless networking techniques or with radios in other automobiles 190, 192, 194 via an ad-hoc mode of network communication.

Figure 2:
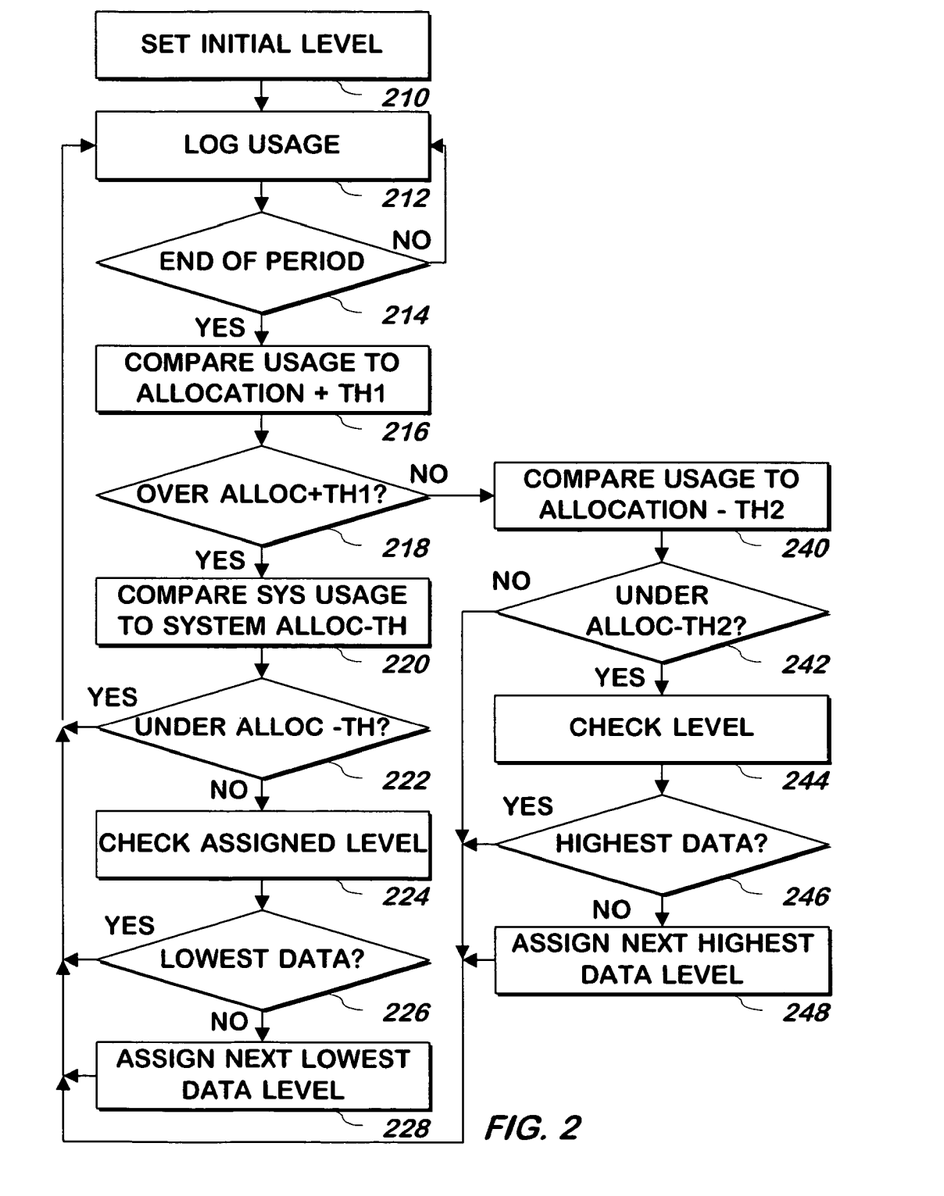
FIG. 2 is a flowchart illustrating a method of assigning data levels to devices according to one embodiment of the present invention.

Referring now to FIG. 2, a method of assigning data levels to devices is shown according to one embodiment of the present invention. An initial data level is set 210. In one embodiment each device is set with an initial level at the highest data level possible. In another embodiment, the initial level is set to a level according to historical values, for example the previous month's final data level for that device.

The device's usage of the communication network is logged as described below and the amount of usage is compared with an expected usage during an analysis period 212. In one embodiment, the analysis period is the amount of time between the start of the most recent period in which overall system usage is measured, for example, the start of the current month, and the current date and time. The expected usage is the amount of data contracted divided by the number of devices for which usage of the communication network is expected during the entire current period in which system usage is measured. Thus, if 200 gigabytes is the amount of data contracted per month, starting on the $5^{th}$ of the month, and 100,000 devices are expected to use the communication network, the expected usage is 2 megabytes per month. If the current date is 12:01 am the $20^{th}$ of the month, the expected usage of any device is 1 megabytes, because the month is exactly half over. In one embodiment, not all of the contracted data amount is allocated to the devices. For example, 200 gigabytes may be allocated in the example above, though 210 gigabytes may have been contracted from the cellular service provider or a reseller of such services.

In one embodiment logging the usage means logging the cumulative number of bytes that the device communicates, though other measures may be used. In one embodiment, all data sent to the device and received from the device via the communication network is logged, though other embodiments may exclude certain data, for example, data that reports traffic status may be excluded from the analysis because it is provided for the benefit of the system and not the device.

If the end of an analysis period has not occurred 214, logging of the usage of the device continues 212. In one embodiment, an analysis period is 48 hours, though other analysis periods may be used.

If the end of the analysis period occurs 214, the usage of the device is compared to an allocation for the user plus an optional first threshold 216. In one embodiment, the first threshold is used to allow the user to slightly exceed the allocation or amount expected for that device over any period of time so that minor amounts of excessive use will not cause the user to be reassigned to a different data level. In another embodiment, the first threshold is equal to zero, and in another embodiment the first threshold may be a small negative number.

If the device has used the communication facility more than the allocated amount plus the first threshold 218, the method continues at step 220, and otherwise 218, the method continues at step 240.

At step 220, the device being analyzed has exceeded its allocated usage pro-rated for the date. However, in one embodiment, the device will not be assigned to a different data level for so long as the system usage has not exceeded the pro-rated amount of data usage allocated to the devices, 100 gigabytes in the example above. Thus, at step 220, the system usage of the communication facility is compared to a system allocation, i.e. the pro-rated amount of the contracted system usage allocated to the devices, minus an optional small system threshold 220. The contract may allow for the system usage to be exceeded, and so the contracted system usage is the amount for which a penalty, or a higher penalty than one normally paid, is incurred. The system threshold may be a function of the proximity of the date to the end of the period in which system usage is measured. Thus, at the start of the contract month, the system threshold may be larger than it is at the end of the contract month, the fifth of the month in the example above. The system threshold may be used to ensure that the system usage of the communication facility is not used to relax the data level assignments unless the system usage of the communication facility is under its allocated amount by at least a little bit. In one embodiment, the system threshold used in step 220 is zero, or it may be a negative number. If the overall system usage of the communication facility is under the allocation less the threshold 222, the method continues at step 212. This means that, although the device is over its allocation, because the entire system is under its allocation, or under its allocation less the threshold, the individual device that exceeds its allocation plus the first threshold will be allowed to continue operation at the current data level. In one embodiment, the first threshold referenced in step 216 is used in place of this step, with the threshold being a larger positive number if the system usage is less than the pro-rated system allocation, and may also be a function of the date as described above.

If the system usage exceeds the system allocation less the threshold 222, the data level currently assigned to the device is checked 224. If the level assigned to the device is the lowest data level 226, the method continues at step 212. In this case, no further reduction of data is possible, and therefore the data level assigned to that device will not be reduced. In the device is not at the lowest data level 226, the next lowest data level is assigned to that device 228, and the method continues at step 212. As used herein, the "next lowest" level is one level lower than the current level.

It isn't necessary to reassign the data level for each detected discrepancy as described above. In one embodiment, the data level is reassigned only if the discrepancy detected as described above is detected in both of the last two analysis periods. Such an arrangement prevents the data level from being frequently reassigned lower, then reassigned higher. In one embodiment, reassignment is performed only upon system sign on, which the device may perform twice per day. Usage logging occurs nearly continuously as described herein, with updating of device statistics occurring every few minutes.

The device may keep the existing assigned data level, or the device may be assigned a higher data level if the device is not being assigned a lower data level. At step 240, the usage of the communication facility by the device is compared to the pro-rated allocation described above minus a second threshold. If the device's use of the communication facility is under the allocation minus the second threshold 242, the current data level assigned to the device is checked 244. If the device is assigned the highest data level 246, the method continues at step 212, and otherwise 246, the device is assigned to the next higher data level 248. If the use of the communication facility by the device is not under the allocation to that device less the threshold 242, the method continues at step 212. In one embodiment, the second threshold is determined as a function of how far under or over the system usage is as compared with the pro-rated contracted amount assigned to the devices, how close to the end of the period in which system usage is measured, or both, in a manner similar to that described above. In one embodiment, reassignment to a higher data level is not made upon the detection of each under-usage as described above. Instead, reassignment to a higher data level is only made if the device is detected to be under its pro-rated usage in two consecutive analysis periods, for example.

Figure 3:
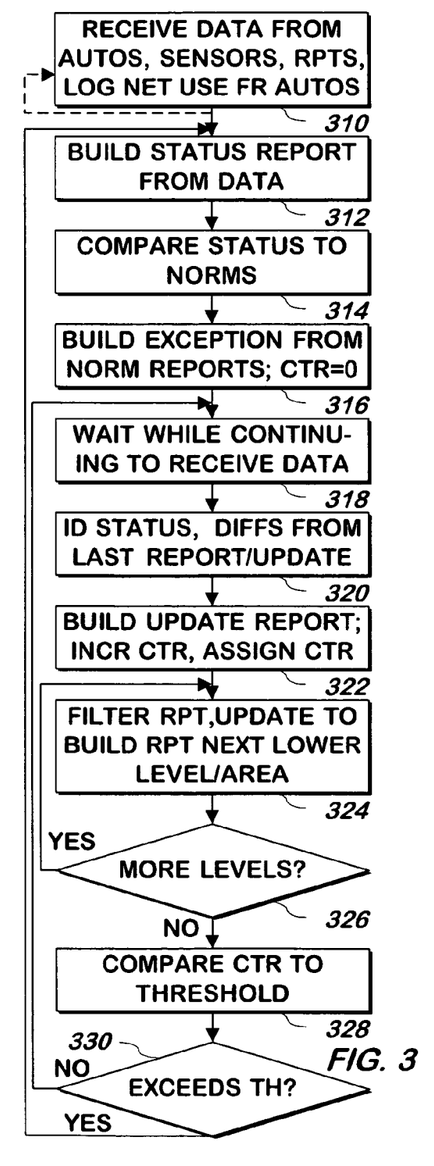
FIG. 3 is a flowchart illustrating a method of building reports for different data levels according to one embodiment of the present invention.

As devices are being assigned and reassigned data levels, information may be received that will be provided to such devices. Referring now to FIG. 3, a method of generating reports at different data levels including such data is shown according to one embodiment of the present invention. Data is received from automobiles as described in more detail below, and may be received from other automatic sources, such as sensors, as well as from manual sources, such as reporting sources, including reports from government agencies such as local transportation agencies or police departments 310. There may be any number of such reports, sensors and other sources of information. In one embodiment, step 310 operates as a continuously running independent process as shown by the dashed line in the Figure.

In one embodiment, the data from automobiles received in step 310 is provided by a device as described herein, and the data includes the location of the device, the date and time of such data, and an identifier of the device. If the data is received via the communications network, as part of step 310 such use is logged, for example by adding the number of bytes used for the communication of such data to a counter of all bytes sent or received over the network to or from that device.

One or more status reports are generated 312 from the data received in step 310. In one embodiment, the status reports are traffic-related, for example including information such as the travel time of traffic through each road segment in a metropolitan area, but other types of status may be reported, such as weather status. The travel time through a segment includes the driving time that will occur from the start of a road segment to the end of that road segment, such segments being defined by any number of conventional map databases. In one embodiment, status is built in step 312 by mapping the locations received from automobiles to the start or end of a segment on a road using a conventional map databases, and identifying the difference in times from when the automobile entered the segment to when the automobile left the segment. If the precise time of entry in, or exit out of, a segment is not identified, it may be interpreted from the two data points received that occur on either side of the edge of a segment. Alternatively, a device may report the travel time or average speed through or in a segment as described below. If different devices report different data regarding the same segment in the same period of time, the different data may be averaged, or averaged after removing outliers, or the median may be taken, or the most recent two may be averaged or the most recent value may be used. Periods of time may be thirty or fifteen minutes in one embodiment. In one embodiment, the data used to build the reports is data that has a date and time following the prior report. In another embodiment, a report is generated by taking up to the last five travel times reported for a segment, and averaging them or taking their median.

In one embodiment, multiple status reports, each corresponding to a different metropolitan area, are generated as part of step 312.

In one embodiment, to reduce the amount of data to be sent as part of the report, the status built in step 312 is compared to a database of travel time averages for each segment of each road for given blocks of time on each day, such averages having been produced by averaging travel times that have been established over a period of time 314. The times in the database that are used are those that correspond to the times of the current travel time measurements, for example times in the same fifteen minute period. An exception report from the travel time averages is generated 316, using the status and the averages compared in step 314. The exception report may provide a deviation from the database reading corresponding to any segment that has a deviation of more than five percent or ten percent from the time stored in the database, such report including a segment identifier and the percent deviation for each such segment, with other segments not being included as part of the exception report, thereby implying that their travel times are within five percent or ten percent of the times stored in the database.

The time stored in the database may be the average of several measurements received from devices over a period of time such as a few weeks or as long as a few years. If insufficient data has been received from devices, the time stored in the database may be the length of the segment multiplied by the posted speed limit at that segment.

In one embodiment, travel times for each segment are stored in the database for several periods throughout the day, such as half hour periods. There may be different travel time storage areas in the database for different types of days for each half hour period. For example, there may be different travel storage areas for a given segment for the 5 pm-5:30 pm period for Sundays, Saturdays, non-holiday weekdays and holiday weekdays. In one embodiment, such different storage areas for different types of days exist for certain types of roads, for example, freeways and major arteries, but residential roads have only a single storage area for each half hour period that cover all days, or fewer storage areas: one covering non-holiday weekdays and another covering all other days.

In one embodiment, there may be different storage areas within each type of day and period for different times of the year. For example, for each period and type of day for roads near beach areas, there may be storage for one travel time during the summer and another travel time for the remainder of the year. For example, for each period and type of day for roads near downtown shopping areas, there may be storage for one travel time between Thanksgiving and Christmas day and another storage for travel time for the remainder of the year. This allows the data provided as described herein to be reduced, because the data that is provided describes exceptions from the database. The database may be occasionally downloaded from the server to the devices as the database is updated to reflect data received and as additional storage areas are added for periods.

As part of step 316, a counter is set to zero. The counter is used to determine whether another exception report is to be generated, or whether an update to that report is to be generated. The counter is assigned to the exception report, to allow exception reports to be distinguished from updates as described below. Thus, the exception report will have a counter value of 0, and update reports, described below, will have nonzero counter values. In one embodiment, as part of step 316 the exception report is filtered to provide different reports for different data levels as well as for different segments within each data level, as described in more detail below. The description below refers to update reports, but the exception report may be filtered in the same or a similar manner.

An optional waiting time may be implemented in step 318, however, as noted above, the data continues to be received from automobiles, sensors, and reporters in step 310 in a continuously independently running process indicated by the dashed line in the figure. At the end of the waiting period of step 318, differences from the last exception report or an update report, described in more detail below, are identified 320, using the status report of step 312 or the update report from a previous iteration of step 322. In one embodiment, step 320 includes identifying differences from the last exception or update report sent to each data level, and such identification is performed on a data level by data level basis. At step 322, an update report that identifies the differences in status from the previous status report or the most recent update report is built, or built for each data level, and a counter is incremented. The update report may contain the travel time through a segment only for those segments that have changed in such measurements, or changed by the threshold amount, since any immediately preceding report. The counter is assigned to the update report as part of step 322.

The update report is filtered to build an update for the next lower data level, or for the next lower data level for one or more areas 324.

Figure 4:
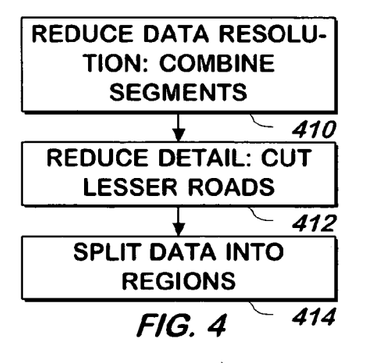
FIG. 4 is a flowchart illustrating a method of filtering data according to one embodiment of the present invention.

As an exception or update report is filtered, each such exception or update report is assigned a data level to which that report corresponds. In one embodiment, a method of filtering a report is shown in FIG. 4 according to one embodiment of the present invention. FIG. 4 illustrates several filtering components, any or all of which may be used to filter a report. The resolution of the data in the report may be reduced 410, for example by combining segments to produce larger segments and thereby producing less data because there will be fewer segments for which to report status. In one embodiment, each segment has associated data that identifies the average or median travel time through the segment. To combine segments, an average of each of the segments being combined may be reported as the average travel time through the segment, or a median of the travel times of the individual segments may be reported as the average time of the combined segment. The resulting time, and an identifier of the segment combination, are stored as part of the report.

In one embodiment, each road in a metropolitan area is assigned an anchor point and each anchor point is assigned an identifier and a positive and negative direction. To specify a portion of the road that corresponds to more than one segment, the identifier of the anchor, an offset from the anchor at which the portion of the road begins, and the length of the portion may be specified. The offset may be measured in lengths of the portion, or a different value, which may also be assigned to the anchor point to ensure that the entire length of the road, less the smallest portion, can be specified using the number of bits assigned to that function. The length may be specified using enumerated values, or multiples of a value that is assigned to each anchor point or is used by all anchor points.

Detail may be removed from the report 412. In one embodiment, removing detail may include removing data reported for lesser roads. For example, an intermediate level of data may have the travel time for segments corresponding to residential roads removed, but may continue to report travel time of segments on freeways and major arteries. A lowest level of data may include only travel time of segments on freeways. As noted below, status at a higher level may be obtained by a device via other devices or communication networks, which will not affect the usage of the communication facility.

In one embodiment, the scope of coverage may also be reduced. Step 414 involves assigning less than all of the data from the report into a report for each of several geographical regions within the metropolitan area corresponding to the report, and assigning a region identifier to each report so filtered. Each region may correspond to a single, contiguous region in a metropolitan area which may or may not correspond to a physical region of the area. Regions may or may not overlap. Thus, some of the same data may be segregated into one or more regions, with the same data falling into either one, or more than one region. In one embodiment, a report at the highest data level may include data pertaining to an entire metropolitan area. Lower levels may report data only for smaller subsets of the metropolitan area to reduce the scope of coverage of the data 414.

As noted below, in one embodiment, lower data levels may not receive all of the reports, and so the filtering of reports is performed to the extent required to provide the filtered versions of reports that will be actually sent.

Referring again to FIG. 3, if there are more data levels 326, the method continues at step 324 to further filter the report for the next lowest level. If there are no more levels 326, the method continues at step 328. At step 328, the counter is compared to a threshold, and if the counter does not exceed the threshold 330, the method continues at step 318. If the counter exceeds the threshold 330, the method continues at step 312. In one embodiment, the threshold for the counter is four, though other embodiments may use other thresholds. Thus, an exception report may be followed by one or more update reports, and then another exception report is generated. This process may continue indefinitely, generating any number of exception and update reports.

In one embodiment, rather than identifying standard reports that can be broadcast to multiple vehicles, an individual report is generated that can be provided to a single vehicle. In such embodiment, the report may be limited to a small area in the trajectory of the device, as indicated by the last two or three reported locations of the device, or the report may be for segments in or in and nearby, a set of driving directions computed by the device in response to a destination or destination and source address. In such embodiment, the device provides identifiers of the segments to the server and the report is created only for those segments.

Report Formats

In one embodiment, exception reports use a different format from update reports. In one embodiment, the exception report contains, for each segment or combined set of segments, the amount of the difference from the database of average or median measured travel times or those calculated from the posted speed limit if that amount exceeds a threshold. In such embodiment, some or all of the update reports employ a shorter indication that lists an enumerated percentage range for each segment showing a change from the prior reported travel time for that segment. In one embodiment, the enumerated percentage ranges are (i) no change in travel time by at least ten percent, as confirmed by additional data received, (ii) an increase in travel times by at least ten percent, (iii) a decrease in travel time by at least ten percent, and (iv) no data regarding that segment or combined set of segments has been received, each of which may be represented using two bits. In one embodiment, the shorter indication may be used for update reports corresponding to lower data levels, with update reports for other data levels using the longer, more complete indication of any changes. In one embodiment, even the exception reports use the shorter indications for the lowest data levels.

Initial Report: Trend Report

In one embodiment, when a device signs on, a trend report is provided to the device. The trend report contains an identifier of each segment that reports a significant increase or decrease in travel time, and an enumerated value which can be as small as one bit, indicating the increase or decrease. The increase or decrease may be from that stored in the database, that provided in the most recent exception report, or that provided in the most recent report of any kind. In one embodiment, the trend report is provided as part of each exception report, but the trend is only distributed with the first such report after sign on or the first report provided within a certain period.

Distribution of Reports

Figure 5A:
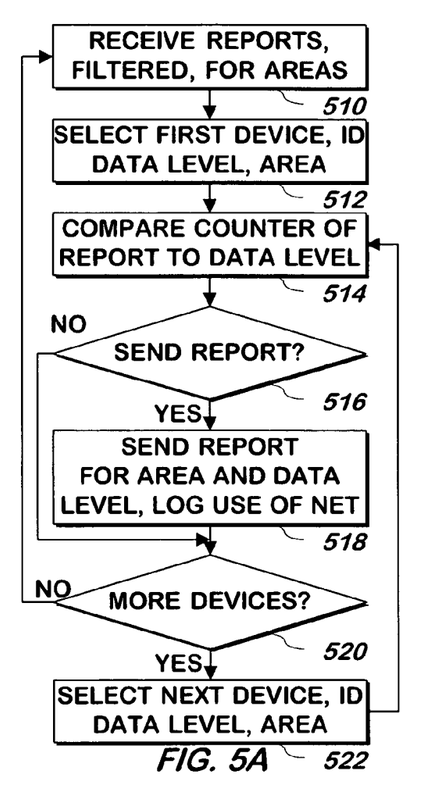
FIG. 5A is a flowchart illustrating a method of providing reports to devices according to one embodiment of the present invention.

Referring now to FIG. 5A, a method of distributing reports according to an assigned data level of a device is shown according to one embodiment of the present invention.

A set of reports, e.g. corresponding to a status report or an update report, is received 510 as described above. The set of reports include an unfiltered report, as well as one or more filtered versions of the report, filtered as described above.

A first device is selected, and the data level and area corresponding to the device is identified 512. In one embodiment, the area of the device is the area that the device last reported to be its current location, or, if the device was near the edge of the area, the area in the trajectory of the device, as determined by the last two reported locations of the device. The data level is identified as the one most recently assigned to the device as described above. In one embodiment, only the data level is identified at step 512, and the area corresponding to the device is identified at step 518 before the report is sent.

The counter corresponding to the set of reports received in step 510 is compared 514 to the data level of the device. In one embodiment, devices assigned to all data levels receive the exception report, identified using its counter level of 0, and the update report with the counter value of 2. Only devices assigned to the highest data level receive update reports with counter values of 1 and 3. Devices assigned to the top two data levels receive update reports with a counter value of 4. Other arrangements may be used, either those that provide all reports to all data levels, or those that provide a reduced frequency of reports to lower data levels, such as the one just described.

If the data level of the selected device corresponds to the counter level of the set of reports received 516, the version of the report appropriate to the data level and the area assigned to the device is provided 518 to the device using the communication network. The amount of usage of the communication network is logged for the device, such as by adding to a counter assigned to the device the number of bytes sent over the communication network in providing the report. The method continues at step 520. If the data level of the selected device does not correspond to the counter level of the report 516, the method continues at step 520.

In one embodiment, providing the report to the device in step 518 may occur a portion at a time, with contact being initiated via a conventional cellular telephone connection, and when an indication is received that the telephone connection has been established using conventional cellular telephone techniques, the portion of the report is sent and contact the call is terminated. One or more additional contacts are made and an additional portion of the report is provided until the entire report is provided. In one embodiment, one portion of a report may be provided to other devices between successive portions of a report being provided to a device, so the portions are provided in an interleaved manner with respect to different devices, with each device receiving the portion intended for that device, but not the others. This allows the portions of the reports to be provided as they are available.

In one embodiment, only the indication that the call has been completed may be received from the device, and no acknowledgement is provided from the device to the server in response to the portion being provided. In one embodiment, an identifier of the portion provided is maintained for each device. If at the next call, the call to the device cannot be completed, at such time as a call is completed to the device, the entire report need not be provided to the device. In one embodiment, providing the report resumes either at the next portion following the one corresponding to the identifier, or at the portion corresponding to the identifier. The portions are provided with the identifier of the portion to allow the device to discard any duplicates.

At step 520, if there are more devices that have not yet been selected, the next device is selected 522 and the method continues at step 514 using the selected device. If there are no more devices to select 520, the method continues at step 510, waiting if necessary, until the next report is received.

In one embodiment, a device may receive the next report from another source, such as another device, or from the provider of the reports but via another communication channel, and if so received the device may so indicate. In this embodiment, step 514 additionally includes checking for the indication. Step 516 is further responsive to the indication. If the indication was received, the method continues at step 520.

Interruption in Communication

In one embodiment, provision is made to handle interruptions in communication so that when communications are resumed, the device can be updated using a minimum of data. In one embodiment, each report is provided in sections and, as a report is provided, the device will confirm receipt of that section, and such receipt is recorded. In the event that communications are interrupted, distribution of the report will continue from the portion following the last confirmed portion.

In one embodiment, not only are update reports generated indicating differences from a prior report, but reports are also generated to indicate the difference between any update report following the most recent exception report and the most current update report. In the event that a device does not receive an update report, the device may indicate the counter value of the last update report received (and a serial number of the last exception report received) to the server, and the server will provide the most recent exception report (if the one received is not the most recent) and the update report that brings the most recent exception report up to date.

Limitation of Data Uploaded Via the Communication Channel

In one embodiment, the reports sent to a device as described above include an identifier of the data level to which it corresponds, allowing each device to determine what data level has been assigned to that device. In one embodiment, such information is used to upload status information, including any or all of location, date and time the location was taken, segment identifier, travel time in or through the segment, and, in a header, the identifier of the device. In one embodiment, devices assigned to the highest data level may provide data as it is obtained or more frequently than devices assigned to lower data levels, and devices assigned to lower data levels queue the data or queue the data for a longer period before sending it, with devices assigned the lowest levels queuing the data for longer amounts of time.

Figure 5B:
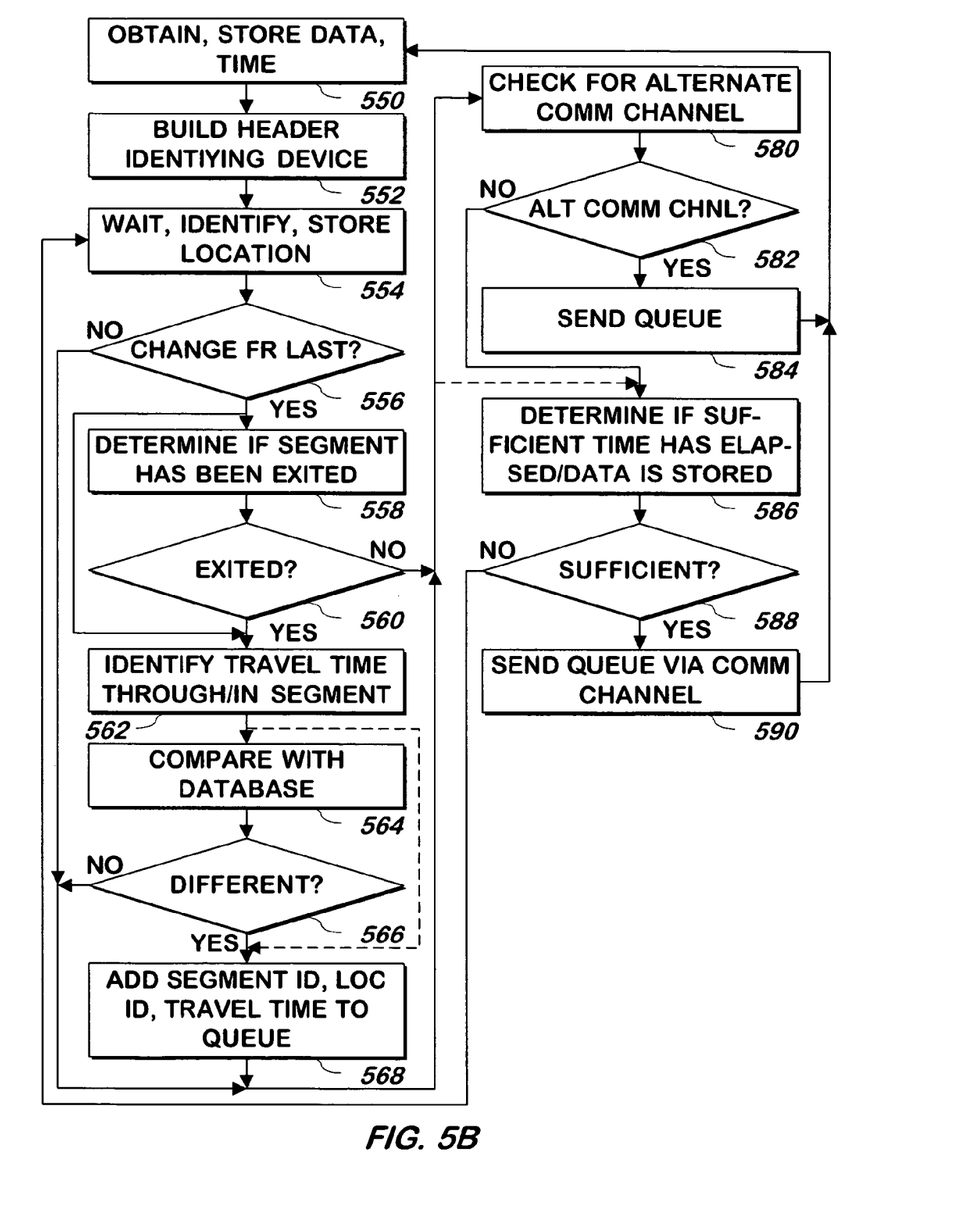
FIG. 5B is a flowchart illustrating a method of uploading data according to one embodiment of the present invention.

Referring now to FIG. 5B, a method of uploading data is shown according to one embodiment of the present invention. The date and time is obtained, for example from a GPS synchronized time clock, and the date and time is stored 550. A header is built that identifies the device, and the header is stored in a queue 552. A period of time is allowed to elapse, and the current location of the device is identified and stored 554, such as by obtaining the location from a conventional GPS receiver. If the location is different from the previous location 556, the method continues at step 558 and otherwise 556, the method continues at step 580.

At step 558, it is optionally determined whether the segment corresponding to the previous location has been exited. If so 560, the method continues at step 562 and otherwise 560, the method continues at step 580. In one embodiment, steps 558 and 560 are not used, and so step 562 follows step 556 as indicated by the dashed line in the Figure.

At step 562, the travel time through the segment or in the segment is identified. The segment is the segment most recently exited in one embodiment, or the segment in which the device is currently located in another embodiment. In one embodiment, the travel time through the segment is extrapolated by using the locations and corresponding times nearest to, and outside of, the segment recently exited. The travel time in the segment may be determined using the two most recent locations and dates and times, extrapolating if necessary, e.g. if one date and time is outside of the segment and the other date and time is in the segment.

The travel time is compared 564 with the normal travel time of the segment for that time period and type of day that is stored in the database as set forth above, and if the two travel times for the segment are different 566, the method continues at step 568 and otherwise 566, the method continues at step 580. At step 568, the identifier of the segment, an identifier of the last location, the date and time, and the travel time for the segment are added 568 to the queue containing the header built in step 552 and the method continues at step 580. In one embodiment, step 568 follows step 562 and steps 564 and 566 are not performed, as indicated by the dashed line in the Figure. In such embodiment, the travel time through the segment is provided even if it is the same as the normal travel time for that time period and type of day. In one embodiment, travel times are provided using the segment identifier (or identifier of a portion of a road) and a percentage deviation from normal for that time and type of day. The percentage may be an enumerated value indicating within 10%, or higher than 10% or lower than 10%, of normal or it may be the actual percentage.

At step 580, a check is made as to the availability of an alternate communication channel, other than the one for which the device receives different reports based on use, as described above. If such communication channel is available 582, the header and data queued in one or more various iterations of step 588 are provided 584 via the alternate communication channel. (In one embodiment, steps 580 through 584 are not used, and steps 586-590 are used instead; as indicated by the dashed line in the Figure.) If no such alternate communication channel is available 582, a determination is made 586 as to whether a threshold amount of time has elapsed from the date and time stored in the most recent iteration of step 550, or whether the data in the queue has exceeded a threshold amount of data. In one embodiment, the time threshold or data threshold or both are a function of the data level of the device, reported in the most recently received of the reports provided as described above, such reports being received by the device. The data levels corresponding to more data will be assigned a lower time threshold, lower data threshold, or both than those data levels corresponding to less data. If either the amount of time has exceeded the threshold, or the amount of data has exceeded the threshold 588, the data from the queue, including the header and the data queued in step 568, is provided to the server via the communication channel. The communication channel is the one for which usage is logged and for which usage can alter the data level as described above. The server will log the number of bytes transmitted. Data provided as part of steps 584 or 590 is removed from the queue.

System

Figure 6:
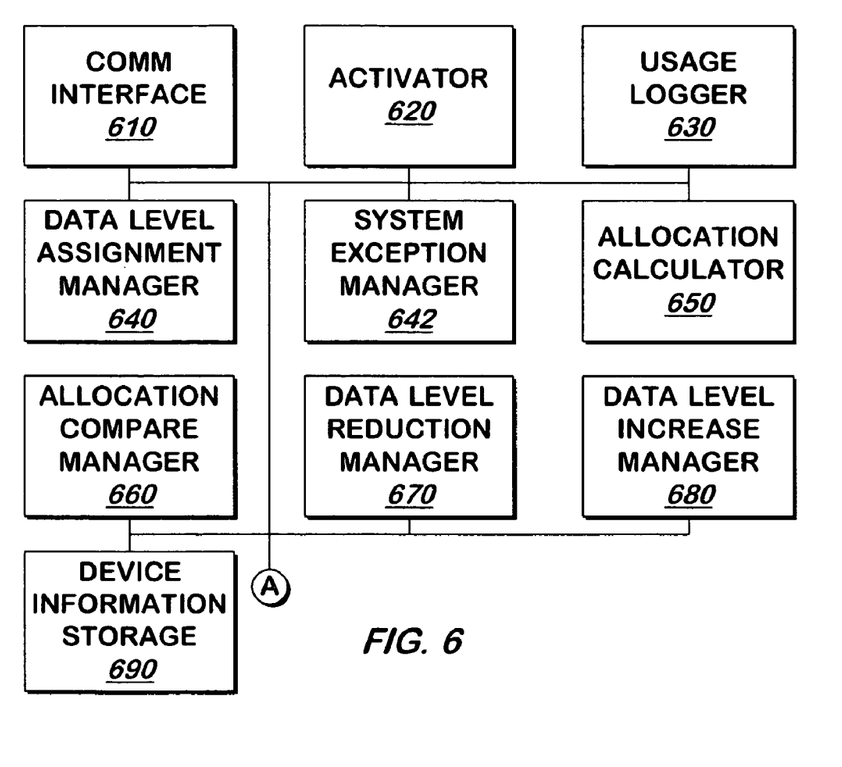
FIG. 6 is a block schematic diagram of a system for assigning data levels to devices according to one embodiment of the present invention.

FIG. 6 is a block schematic diagram of a system for assigning data levels to devices according to one embodiment of the present invention. Such a system may be part of server 186.

In one embodiment, a system administrator may activate each device to which data levels are assigned. Referring now to FIG. 6, at any time, activator 620 may receive a device identifier along with device contact information such as a phone number used to communicate with the device being activated from a system administrator via communication interface 610. In one embodiment communication interface 610 includes a conventional network interface such as a TCP/IP-capable communication interface, which may include a conventional device such as a modem or router capable of transmitting and receiving information across a network such as the Internet, a cellular telephone network, or both. When activator 620 receives the device identifier and contact information, activator 620 stores this data in a device record for the device in device information storage 690. In one embodiment, device information storage 690 includes a conventional database. The device record stored by activator 620 also includes a usage tally, which activator 620 initially sets to zero; a pending data level, which in one embodiment activator 620 initially sets to the highest data level, for example Data Level A; and an assigned data level, which activator 620 initially sets to the highest data level, for example Data Level A.

At any time, usage logger 630 may receive a device identifier along with a number of bytes from data receiver 712 or from report sender 940, as described below. When usage logger 630 receives such information, usage logger 630 adds the number of bytes received to the usage tally for the device identifier in device information storage 690. Usage logger 630 receives the start of the period in which system usage is measured as described above. At the start of such period, usage logger 630 zeros the usage tallies for each device.

Periodically, for example at the end of each day, data level assignment manager 640 determines whether the pending data level of devices should be adjusted, as described below. If so, data level assignment manager 640 changes the value of the pending data level recorded for the device in device information storage 690 as described below. When the device logs in, it provides its device identifier to data level assignment manager 640, which finds the device record for that device identifier in device information storage 690, and copies the pending data level into the assigned data level in that record.

To determine whether the pending data level should be adjusted, data level assignment manager 640 first signals system exception manager 642 with the dates of the period in which system use is measured (referred to herein as the system measurement period), which in one embodiment is received from a system administrator and stored internally by data level assignment manager 640.

When signaled, system exception manager 642 retrieves an internally stored system allocation provided by a system administrator. System exception manager 642 determines whether the actual system usage during the period from the start of the system measurement period to the current day has exceeded a pro-rated system allocation. As previously described, the pro-rated system allocation is a target amount of usage by all devices, pro-rated for the period since the start of the current system measurement period to the current time. In one embodiment, system exception manager 642 calculates the pro-rated system allocation using the system allocation, the dates of the system measurement period, and the current date, which system exception manager 642 receives from the operating system (not shown). System exception manager 642 may also calculate a system tolerance, which may be a function of the proximity of the current date to the end of the period in which system usage is measured, and may subtract the (optionally pro-rated) system tolerance from the pro-rated system allocation, as described above with respect to step 220. To determine the system usage, system exception manager 642 sums all of the usage tallies for some or all device records stored in device information storage 690. To determine whether the system usage has exceeded the system allocation, system exception manager 642 compares the sum of the usage tallies to the pro-rated system allocation less the optional system tolerance, also optionally pro-rated. If the sum of the usage tallies exceeds the pro rated system allocation minus the optional system threshold, system exception manager 642 determines that the system usage has exceeded the system allocation; otherwise, system exception manager 642 determines that the system usage has not exceeded the system allocation. When system exception manager 642 has performed the comparison, system exception manager 642 provides data level assignment manager 640 with an indication of whether or not the system usage has exceeded the system allocation, along with the pro-rated system allocation.

Data level assignment manager 640 provides allocation compare manager 660 with the pro-rated system allocation and the indication of whether or not the system usage has exceeded the system allocation, along with the dates of the system measurement period.

When allocation compare manager 660 receives the pro-rated system allocation, the indication of whether or not the system usage has exceeded the system allocation, and the dates of the system measurement period, allocation compare manager 660 determines whether any of the devices for which information is stored in device information storage 690 have exceeded an allocation or are under the allocation. In one embodiment, if the indication of whether or not the system usage has exceeded the system allocation indicates that the system usage has not exceeded the system allocation, allocation compare manager 660 only makes the determination of whether any of the devices are under the allocation.

To make these one or two determinations, allocation compare manager 660 calculates a device allocation, for example by determining the number of devices for which usage information is stored in device information storage 690, and dividing the pro-rated system allocation by this number. As described above with respect to step 216, allocation compare manager 660 may add an optional first threshold to the device allocation.

It isn't necessary to use the same device allocation for every device as described herein. In another embodiment, a total device allocation for the entire system measurement period is stored by a system administrator in device information storage 690 for each device, with different devices receiving one of several such total device allocations based on a fee paid or to be paid by the user of that device. In this embodiment, allocation compare manager 660 pro-rates each such total device allocation to compute that device's device allocation based on the system measurement period and the current date, received from an operating system (not shown).

If the indication indicates the system usage has exceeded the system allocation, for each device for which usage information is stored in device information storage 690, allocation compare manager 660 compares the usage tally for that device to the device allocation for that device, plus an optional first threshold, which may be positive, negative or zero. For each device for which the usage tally exceeds the device allocation, allocation compare manager 660 provides that device identifier to data level reduction manager 670, which proceeds as described below.

For each device for which the usage tally does not exceed the device allocation plus the optional first threshold, allocation compare manager 660 compares the usage tally to the device allocation minus a second threshold as previously described with respect to step 240. The second threshold may be positive, negative or zero. If the usage tally is greater than the device allocation, optionally, minus the second threshold, allocation compare manager 660 determines that the assigned data level of that device should not be adjusted. However, for each device for which the usage tally is less than the usage allocation minus the optional second threshold, allocation compare manager 660 provides that device identifier to data level increase manager 680.

When data level increase manager 680 receives a device identifier from allocation compare manager 660, data level increase manager 680 checks the assigned level of that device in device information storage 690, and if possible sets the pending data level to the next highest data level above the assigned data level, as described above with respect to steps 244-248.

When data level reduction manager 670 receives a device identifier from allocation compare manager 660 as described above, data level increase manager 670 checks the assigned level of that device in device information storage 690, and if possible sets the pending data level to the next lowest data level above the assigned data level, as described above with respect to steps 224-228. It isn't necessary to use pending and assigned data levels as described herein. In one embodiment, only a single data level is used for each device, and that level is identified in the manner described above for the pending data level.

Figure 7:
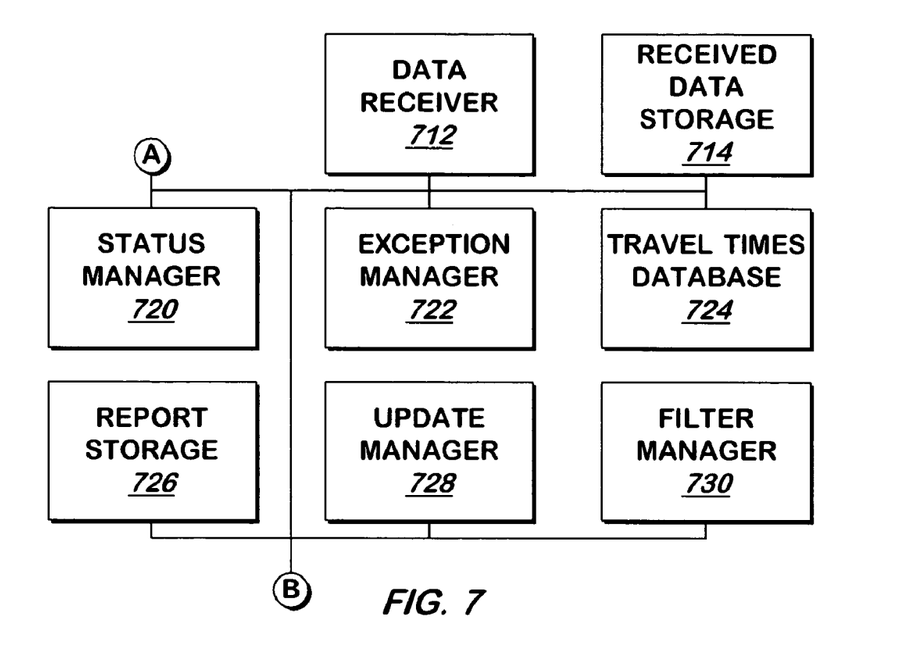
FIG. 7 is a block schematic diagram of a system for building reports for different data levels according to one embodiment of the present invention.

FIG. 7 is a block schematic diagram of a system for building reports for different data levels according to one embodiment of the present invention. Such a system may be part of server 186. Referring now to FIG. 7, at any time, data receiver 712 may receive data via communication interface 610, for example from automobiles. In one embodiment, data receiver 712 may also receive data from other sources such as sensors, or may receive reports, for example in the form of RSS feeds, from government agencies such as local transportation agencies or police departments. When data receiver 712 receives such information, data receiver 712 stores the information in received data storage 714. In one embodiment, received data storage 714 includes a conventional database. In one embodiment, data received from automobiles includes any or all of a date and time (or such a date and time may be added to the received data by data receiver 712, after receiving such date and time from an operating system); a location; a travel time of the segment just traversed; a current speed in the segment currently being traversed; and a device identifier. When data receiver 712 receives such data, in addition to storing the data, data receiver 712 also provides usage logger 630 with the device identifier and the number of bytes of data received from the automobile as described above, and usage logger 630 adds that number of bytes to the usage tally for the device record for the device in device information storage 690.

At system start-up, or when signaled by update manager 728 as described below, exception manager 722 signals status manager 720. When so signaled, status manager 720 uses the data in received data storage 714 to build a status report, which may for example include travel times through each road segment for which data has been received, as described above with respect to step 312. When status manager 720 has built the status report, status manager 720 provides the status report to exception manager 722.

When exception manager 722 receives the status report from status manager 720, exception manager 722 builds an exception report. To build the exception report, exception manager 722 compares the data in the status report to data contained in travel times database 724. In one embodiment, travel times database 724 includes a conventional database. In one embodiment, travel time averages for each segment of each road for given blocks of time on each day, produced by averaging travel times that have been established over a period of time, are periodically stored in travel times database 724 by status manager 720, and the database is provided to the devices by report manager 910 in the manner described for reports below. Other information, such as average weather information for each segment of each road for given blocks of time on each day, may be similarly provided by a system administrator and stored in travel times database 724 in other embodiments. Exception manager 722 builds an exception report that details any significant differences between the data stored in travel times database 724 and the data given for corresponding segments in the status report received from status manager 720. In one embodiment, as described above with regard to step 316, a significant difference is a deviation of more than ten percent from the data stored in travel times database 724. As previously described, in one embodiment, the exception report includes a segment identifier and the percent deviation for each such segment, with other segments not being included as part of the exception report, thereby implying either that no current data has been received for those segments or that their travel times are within ten percent of the times stored in the database. Such segment data may be provided as described above. Exception manager 722 also assigns a value of 0 to the exception report to indicate that it is an exception report.

In one embodiment, exception manager 722 builds and includes in each exception report a trend report as described above. Exception manager 722 may use any or all of the status report, the last exception report and the current exception report to build the trend report.

When exception manager 722 has built the exception report, exception manager 722 identifies the exception report as being for the highest data level, for example by assigning the designation "A" to the report, indicating that it corresponds to data level A. Exception manager 722 also initiates the creation of exception reports for each other data level, which in one embodiment are identical copies of the report for the highest data level, but are identified by different designations, such as "B" and "C", and in another embodiment are filtered as described below. Any number of data levels may be used, and in other embodiments, exception manager 722 may use other methods of identifying reports, such as changing the filenames of reports. Exception manager 722 stores the reports in report storage 726 and provides the reports, or alternatively provides pointers to or filenames of the reports, to filter manager 730.

Figure 8:
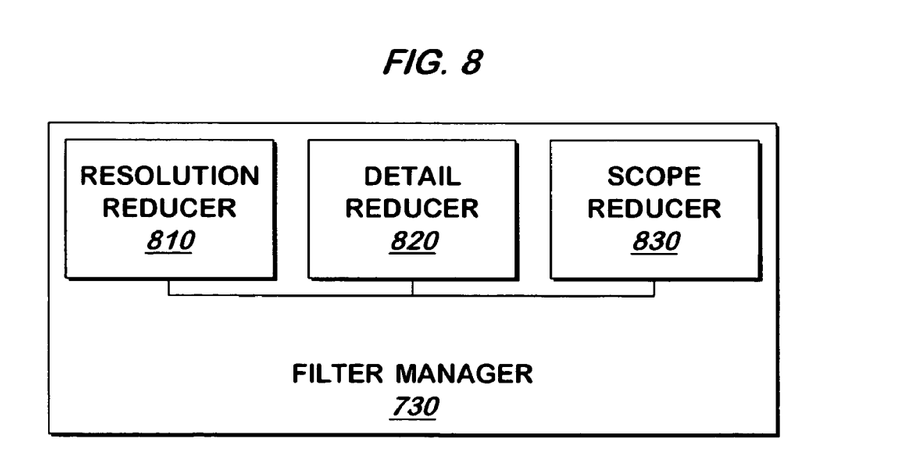
FIG. 8 is a block schematic diagram of a system for filtering data according to one embodiment of the present invention.

When filter manager 730 receives reports, or pointers to or filenames of reports, either from exception manager 722 or from update manager 724 as described below, filter manager 730 filters the reports. FIG. 8 is an illustration of filter manager 730 shown in more detail according to one embodiment of the present invention. Referring momentarily to FIG. 8, filter manager 730 includes three components, any or all of which may be used to filter a report. Resolution reducer 810 reduces the resolution of a report as described above with respect to step 410. Detail reducer 820 reduces the detail of a report as described above with respect to step 412. Scope reducer 830 splits the report into multiple reports, each of which describes a region of reduced scope and is identified as corresponding to such a region, as described above with respect to step 414. The regions may overlap.

In one embodiment, reports for the highest data level are filtered only by scope reducer 830, or are not filtered except to be identified as corresponding to the largest possible region. In one embodiment, filter manager 730 may perform multiple iterations of filtering for lower data levels, such as filtering the reports once for the "B" data level and twice for the "C" data level, in order to produce sets of reports where reports for lower data levels contain less resolution, detail, and/or scope than reports for higher data levels.

Filter manager 730 retains the counter values and identifiers of data level on each report. Each report produced by filter manager 730 will therefore carry three identifiers: a value such as 0, 1, 2, etc., identifying the report as an exception report or as one of a sequence of update reports as described below; a designation such as A, B, C, etc., identifying the report as being for one of the number of data levels; and a region identifier.

Referring again to FIG. 7, when filter manager 730 has filtered each report appropriately for its data level, filter manager 730 provides the reports to report manager 910. In other embodiments, filter manager 730 may store the filtered reports, for example in report storage 726, and provide report manager 910 with a pointer to the reports or with the filenames of the reports. Filter manager 730 also signals update manager 728.

When update manager 728 receives a signal from filter manager 730, update manager 728 checks an internal counter and compares the counter to a predetermined threshold, for example, 3. If the counter has not been set, or if the counter does not exceed the threshold, update manager 728 sets a timer for a predetermined time, for example, five minutes. During this time, data receiver 712 will continue to receive and store data as described above. When the timer expires, update manager 728 signals status manager 720. When so signaled, status manager 720 builds a new status report using the data in received data storage 714 as described above, and provides the status report to update manager 728.

When update manager 728 receives a status report from status manager 720, update manager 728 creates update reports as required for each data level. To create an update report for the highest data level, update manager 728 checks report storage 726 and selects the most recent report (status or update) stored there corresponding to the highest level, which may for example be designated with the letter "A". In the embodiment that filtered reports are also stored in report storage 726, update manager 728 ignores these reports, which may for example be identified because they include region identifiers.

Update manager 728 uses the selected report and the status report to build an update report that details any significant differences, such as a variation of more than ten percent, between the data for a given road segment in the selected report and the data for the same road segment in the status report. For example, update manager 728 may include in the update report information such as the travel time through a segment for those segments that have changed in such measurements since the selected report.

In one embodiment, update manager 728 uses the current date and time, which it obtains from the operating system (not shown), and the data stored in travel times database 724, to express information such as travel times as a percentage deviation from the average times. For example, in this embodiment, if the current time is five o'clock on a Sunday, and the data in travel times database 724 indicates that the average time required to traverse a given road segment at five o'clock on a Sunday is ten minutes, but the status report indicates a current travel time of twenty minutes for that road segment, update manager 728 would include in the update report the segment identifier along with a travel time of 200 percent. Such information would only be included, however, if the current travel time was also significantly different from that given in the selected report. In this example, if the selected report gave a travel time for the road segment of 198 percent of average, update manager 728 would not include data for that road segment in the update report because the difference is not significant.

If data for a road segment is given in the status report, but no data for that road segment is contained in the selected report, for example because no data was available for that segment when the selected report was compiled, or because the data had not changed significantly since a previous report, update manager 728 determines whether any reports with a lower assigned value than the selected report, and corresponding to the same data level, are stored in report storage 726. If so, update manager 728 checks the next most recent report to determine whether data for the given road segment is stored in that report. If so, update manager 728 compares that data to the data in the status report, and if the data is significantly different, update manager 728 includes information for that road segment in the update report. Otherwise, if the data is not significantly different, update manager 728 does not include information for that road segment in the update report. If no data for the given road segment is included in the report, update manager 728 continues to check each stored report corresponding to the same data level for the data, in descending order of their assigned values, going back to the most recent status report, assigned a value of 0. If no stored report for the same data level up to the most recent status report in report storage 726 includes data on the given road segment, update manager 728 checks the data stored for that road segment in travel times database 724. Update manager 728 includes information for that road segment in the update report only if the data given for the road segment in the status report is significantly different from the data stored in the database.

When update manager 728 has built the update report for the highest data level, update manager 728 initializes a counter and sets the counter equal to one, or, if a counter has already been set, increments the counter. Update manager 728 assigns the value of the counter to the update report, and also identifies the report as being for the highest data level, for example by assigning the designation "A" to the report.

Update manager 728 determines whether reports are required for any additional data levels. As previously described, in one embodiment, not every report will be sent to every device. For example, devices at the lowest data level may receive only reports with the values of 0 and 2, while devices at the second level may receive reports with the values of 0, 2, and 4. Therefore, in this embodiment, when update manager 728 has assigned the value of the counter to the report, update manager 728 determines if the value is one for which additional reports are required for devices at different data levels. In the present example, reports with values of 1 and 3 are only sent to the highest data level, so if the value is 1 or 3 update manager 728 will not build additional reports based on the current status.

If at least one report is required for at least additional data level, update manager 728 determines the next data level for which a report is required and selects that data level. For example, if the value of the counter is 2, reports are required for the second and third data levels, so update manager 728 will determine that the next data level for which a report is required is the second data level. Update manager 728 determines the value of the last report received by the selected data level. In the present example, where the value of the counter is 2 and the second data level receives reports with the values of 0, 2, and 4, update manager 728 will determine that the value of the last report received is 0. Update manager 728 selects the report in report storage 726 corresponding to that value and the selected data level, in this example, report 0B. Update manager 728 creates an update report for the selected data level using the selected report, the status report, and the data stored in travel times database 724 as described above, to indicate any differences from the database exceeding the threshold amount that have not already been reported to that data level. When update manager 728 has built the report, update manager 728 assigns the report the value of the counter and identifies the report as being for the selected data level. Update manager 728 also determines whether an additional report is required for another data level, and if so, selects the next data level for which a report is required and builds the report as described above.

In one embodiment, update manager 728 additionally performs checks to prevent update manager 728 from building a report identical to a previously built report. In the example given above, when update manager 728 selects the third data level and determines that the value of the last report received by that data level is 0, update manager 728 may determine that because reports with the value of 0 are identical for all data levels, it is not necessary to build a new report using report 0C. Instead, update manager 728 may simply copy the update report built for the second data level as described above, changing only the identification of the data level to which the report corresponds.

If no additional reports are required, update manager 728 saves all newly built reports in report storage 726 and provides the reports, or alternatively provides pointers to or filenames of the reports, to filter manager 730, which filters the reports appropriately for each data level as described above.

As described above, when filter manager 730 has filtered the reports, filter manager 730 provides the filtered reports for each data level, or alternatively provides pointers to or filenames of such reports, to report manager 910, and filter manager 730 also signals update manager 728.

As described above, when update manager 728 receives a signal from filter manager 730, update manager 728 compares the counter to a predetermined threshold. If the counter does not exceed the threshold, update manager 728 sets a timer as described above, and when the timer expires update manager 728 signals status manager 720 to produce a new status report. Update manager 728 uses the new status report to build new update reports as required for each data level, increments the counter, assigns the value of the counter to the new update report or reports, provides the reports to filter manager 730, and stores the reports as described above. Filter manager 730 filters the reports appropriately for each data level, provides the filtered reports to report manager 910, and signals update manager 728 as described above. This cycle continues until update manager 728 compares the counter to the threshold and finds that the value of the counter exceeds the threshold.

When update manager 728 determines that the value of the counter exceeds the threshold, update manager 728 resets the counter and signals exception manager 722. Exception manager 722 then signals status manager 720 to provide a status report, and exception manager 722 uses the status report and the information in travel times database 724 to build, store, and provide to filter manager 730 an exception report for each data level as described above. Filter manager 730 filters the reports appropriately for each data level, provides the filtered reports to report manager 910, and signals update manager 728 as described above. The cycle of producing update reports thereafter continues, and is periodically restarted, as described above.

Figure 9:
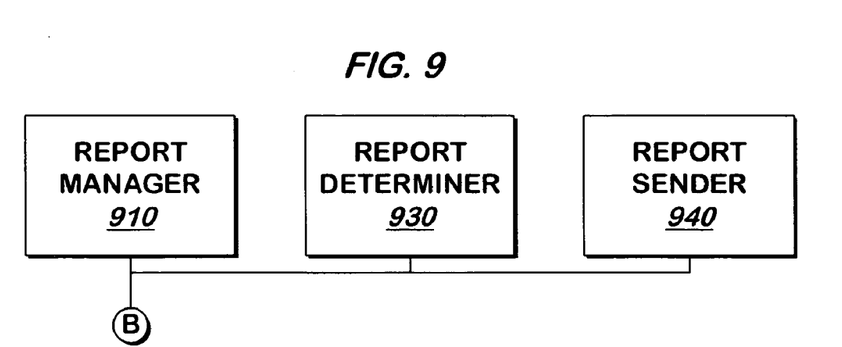
FIG. 9 is a block schematic diagram of a system for providing reports to devices according to one embodiment of the present invention.

FIG. 9 illustrates a system for distributing reports according to one embodiment of the present invention. Such a system may be part of server 186. Referring now to FIG. 9, when report manager 910 receives filtered reports, or alternatively receives pointers to or filenames of such reports, from filter manager 730 as described above, report manager 910 selects the first device for which a device record is maintained in device information storage 690, and finds the data level of the selected device in the device record. Report manager 910 provides the device identifier and the data level of the selected device, as well as the reports, pointers or filenames, to report determiner 930.

When report determiner 930 receives such information, report determiner 930 discards any previously retained reports, pointers or filenames, and determines whether the selected device should receive any of the reports. To do so, report determiner 930 compares the value assigned to the reports to the data level of the device, as described above with respect to step 514. If report determiner 930 determines that the device should not receive any of the reports, report determiner 930 signals report manager 910. Otherwise, if report determiner 930 determines that the device should receive one of the reports, report determiner 930 uses the device identifier to find the location most recently received from that device in received data storage 714. Report determiner 930 provides the location and device identifier, along with the set of reports that correspond to the data level of the selected device, or alternatively pointers to or filenames of such reports, to report sender 940. Report determiner 930 retains the reports, pointers or filenames received from report manager 910.

When report sender 940 receives the location and device identifier along with the reports corresponding to the data level of the device, or pointers to or filenames of such reports, report sender 940 determines which report the device should receive by comparing the location of the device to the regions defined by the reports, as indicated by the region identifiers of the reports. In one embodiment, report sender 940 receives from a system administrator and internally stores a list of predefined regions, their region identifiers, and the latitude and longitude coordinates of their boundaries, and this same list is used by scope reducer 830 to filter the reports into the different area reports as described above. Report sender 940 selects the report corresponding to the region in which the location falls. In one embodiment, if the location does not fall within any regions defined by the reports, report sender 940 does not send a report and instead signals report manager 910. Otherwise, report sender 940 provides the device identifier and selected report to communication interface 610. Report sender 940 also provides usage logger 630 with the device identifier and the number of bytes of the selected report, and report sender 940 signals report manager 910.

In one embodiment, report sender 940 sends the trend report with an exception report only with the first report of the day, the first report after the device logs in, or the first report in another period. After the report is sent, report sender 940 marks the device record in device information storage 690 to indicate that the exception report has been sent with the trend report. Report sender 940 checks the mark in the device record in device information storage 690 when sending each such exception report, and does not send the trend report with the exception report if the device record is so marked.

If the trend report is sent in the first report of the period, at the end of the period such as a day, report sender 940 clears all of the marks in device information storage. If the trend report is sent upon the occurrence of an event such as device log in, the device logs into usage logger 630, which clears the mark for the device record corresponding to the device logging in. In one embodiment, rather than determining whether to send the trend report using a mark, usage logger 630 provides the device identifiers of any devices that have logged in, to report sender 940, which sends the trend report shortly thereafter. Otherwise, the trend report is never sent to the device by report sender 940.

When communication interface 610 receives a device identifier and report, communication interface 610 uses the device identifier to find the contact information for that device in device information storage 690, and sends the report to that device.

When report manager 910 receives a signal from report sender 940, or from report determiner 930 as described above, report manager 910 determines whether one or more device records for any additional devices are maintained in device information storage 690. If so, report manager 910 selects the next device, finds the data level of the newly selected device in the selected device record, and provides the device identifier and the data level of the selected device to report determiner 930, which determines whether the selected device should receive any of the reports as described above, using the retained reports, pointers or filenames. Report manager 910, report determiner 930, report sender 940, and communication interface 610 continue the cycle of selecting devices, determining whether the selected device should receive a report based on its data level, finding the location of any device for which a report should be sent, selecting a report corresponding to that location, and sending the selected report to the selected device, until report manager 910 determines that no additional devices are recorded in device information storage 690.

As noted, devices 190, 192, 194 that receive the reports may provide data to the server 186 as described above with reference to FIG. 5B.

What is claimed is:

1. A processor-implemented method of providing information to a given device among a plurality of devices, the method comprising:
  assigning, to the given device, a data level based at least on an amount of data already communicated to the given device for a given time period, a target total amount of data communication to be communicated to the given device for the given time period, a collective target total amount of data communication to be communicated to the plurality of devices for the given time period, and an amount of data collectively to be communicated to the plurality of devices for the given time period; and
  sending, for reception by the given device, during the given time period a version of an information update to be provided to the given device, the version determined based on the data level assigned to the given device.

2. The method of claim 1, wherein:
  each of the plurality of devices were assigned a previous data level prior to the given time period; and
  the assigning of the data level during the given time period is additionally based on the previous data level.

3. The method of claim 2, wherein:
  the data level assigned is from one of a plurality of data levels having a relative order; and the assigning of the data level during the given time period comprises assigning a data level adjacent to the previous data level in the order of the data levels.

4. The method of claim 1, wherein:

each of the devices was assigned a previous data level prior to the given time period;

the data level assigned comprises one of a plurality of data levels having a relative order; and the assigning the data level during the given time period comprises:

changing the data level in a first direction from the previous data level in the order of the plurality of data levels responsive to the amount of data collectively already communicated to the plurality of devices for the given time period exceeding the collective target amount of data for communication to the plurality of devices by a threshold amount; and not changing the data level in a first direction from the previous data level in the order of the plurality of data levels responsive to the amount of data collectively already communicated to the plurality of devices for the given time period not exceeding the collective target amount of data for communication to the plurality by the threshold amount.

5. The method of claim 1, further comprising receiving data from at least some of the devices in the plurality, and forming at least a portion of content in the information update based on data received from the devices in the plurality.

6. The method of claim 5, wherein the data received from at least some of the devices in the plurality comprises road condition information pertinent to locations of those devices, and further comprises producing portions of the information update relevant to different locations of the plurality of devices.

7. The method of claim 1, wherein the version of the information update sent to a device of the plurality that is assigned a comparatively higher data level is larger than the version of the information update sent to a device of the plurality that is assigned a comparatively lower data level.

8. The method of claim 7, wherein the larger version includes information update associated with a larger geographical area in comparison to the smaller version.

9. The method of claim 1, wherein the data level assigned to the given device controls a frequency rate for sending information updates.

10. The method of claim 1, further comprising producing a plurality of versions of the information update by segmenting portions of the data comprised in the information update based on a geographic region to which each of those portions of data pertain.

11. The method of claim 10, wherein at least one version of the information update includes average weather information for each corresponding geographic region in the information update.

12. The method of claim 1, further comprising producing a plurality of versions of the information update by segmenting portions of the data comprised in the information update based on a geographical region, with at least one version including an average time to travel through a geographical region.

13. The method of claim 1, further comprising producing a plurality of versions of the information update, at least some of the versions comprising different amounts of detail concerning traffic conditions in a geographic region.

14. The method of claim 13, wherein at least one version comprises at least one of increased travel time through a geographical region and decreased travel time through a geographical region.

15. The method of claim 1, further comprising selecting the different amounts of detail by including traffic conditions on comparatively smaller roads in relatively larger versions of the information update, which are excluded from relatively smaller versions of the information update.

* * * * *